United States Patent
Austrheim

(10) Patent No.: US 12,338,070 B2
(45) Date of Patent: Jun. 24, 2025

(54) STORAGE SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 528 days.

(21) Appl. No.: 17/606,606

(22) PCT Filed: Mar. 6, 2020

(86) PCT No.: PCT/EP2020/055961
§ 371 (c)(1),
(2) Date: Oct. 26, 2021

(87) PCT Pub. No.: WO2020/224828
PCT Pub. Date: Nov. 12, 2020

(65) Prior Publication Data
US 2022/0234827 A1 Jul. 28, 2022

(30) Foreign Application Priority Data

May 3, 2019 (NO) .................................. 20190567

(51) Int. Cl.
*B65G 1/04* (2006.01)
*E04B 1/24* (2006.01)
(Continued)

(52) U.S. Cl.
CPC ......... *B65G 1/0464* (2013.01); *B65G 1/0478* (2013.01); *E04B 1/2403* (2013.01);
(Continued)

(58) Field of Classification Search
CPC ..... E04B 2001/2415; E04B 2001/2445; E04B 2001/2463
See application file for complete search history.

(56) References Cited

U.S. PATENT DOCUMENTS 1,748,794 A * 2/1930 Ray ........................... E04B 1/24
52/657
4,069,638 A 1/1978 Hasselqvist et al.
(Continued)

FOREIGN PATENT DOCUMENTS

CN 104837747 A 8/2015
EP 3 477 128 A1 5/2019
(Continued)

OTHER PUBLICATIONS

Office Action in the corresponding Chinese Application No. 202080033154.4, mailed May 26, 2023 (10 pages).
(Continued)

*Primary Examiner* — Jonathan Snelting
(74) *Attorney, Agent, or Firm* — Baker Botts L.L.P.

(57) ABSTRACT

A storage system includes a storage grid structure and multiple remotely operated storage bin handling vehicles. The storage grid structure includes vertical storage column profiles defining multiple storage columns in which storage bins can be stored one on top of another in vertical stacks. Each of the storage column profiles have an upper end and a lower end and the storage column profiles are interconnected at their upper ends by rails forming a horizontal rail grid upon which the bin handling vehicles may move in two perpendicular directions. The storage grid structure features grid supports include multiple base angle brackets. Each base angle bracket includes a vertical flange and a horizontal flange. The vertical flange is connected to a storage column profile. The horizontal flange is connected by bolts to a floor upon which the storage grid is arranged and a web interconnecting the flanges. Each of the flanges has a first end and a second end. The first end is arranged closer than the second end to the lower end of the storage column profile to which
(Continued)

the vertical flange is connected. The web has a recess arranged between the first ends of the flanges.

13 Claims, 10 Drawing Sheets

(51) Int. Cl.
*E04B 1/58* (2006.01)
*E04H 12/22* (2006.01)

(52) U.S. Cl.
CPC .......... *E04B 1/5831* (2013.01); *E04H 12/22* (2013.01); *E04B 2001/5881* (2013.01)

(56) References Cited

U.S. PATENT DOCUMENTS

| | | | |
|---|---|---|---|
| 4,514,950 A * | 5/1985 | Goodson, Jr. | E04B 1/24 52/645 |
| 4,569,169 A * | 2/1986 | Madray | E04C 3/065 52/126.3 |
| 9,004,715 B1 | 4/2015 | Litke et al. | |
| 10,294,025 B2 * | 5/2019 | Hognaland | B65G 1/0464 |
| 2005/0188640 A1 | 9/2005 | Miller | |
| 2007/0107338 A1 * | 5/2007 | Daudet | E04B 1/2403 52/293.3 |
| 2009/0000235 A1 | 1/2009 | Kieran et al. | |
| 2012/0216479 A1 | 8/2012 | Lewcock et al. | |
| 2014/0250822 A1 | 9/2014 | Oetlinger | |
| 2022/0185584 A1 | 6/2022 | Hognaland | |

FOREIGN PATENT DOCUMENTS

| | | |
|---|---|---|
| JP | 2003-247269 A | 9/2003 |
| KR | 2013-0052642 A | 5/2013 |
| NO | 317366 B1 | 10/2004 |
| WO | 2014/090684 A1 | 6/2014 |
| WO | 2015/193278 A1 | 12/2015 |
| WO | 2017/198784 A1 | 11/2017 |
| WO | 2018/210851 A1 | 11/2018 |

OTHER PUBLICATIONS

International Search Report for corresponding International Application No. PCT/EP2020/055961, mailed Jun. 18, 2020 (5 pages).
Writtten Opinion for corresponding International Application No. PCT/EP2020/055961, mailed Jun. 18, 2020 (9 pages).
Norwegian Search Report for corresponding International Application No. 20190567, mailed Dec. 10, 2019 (2 pages).
Henrik Pedersen, First Examination Report for European Patent Application No. 20710868.9, mailed Jul. 16, 2024, 5 pages, European Patent Office, Rijswijk, Netherlands.
Wen Rui et al., Notification of Reexamination of Chinese application No. 202080033154.4, mailed Aug. 15, 2024, 17 pages (including translation), China Intellectual Property Office, Beijing, China.
Lin Guoqiang, Notification of Reexamination for Chinese Patent Application No. 2020800331544, dated Jan. 7, 2025, 33 pages, pub. by SIPO, Beijing, China.
Marko Peltonen, Office Action for Norwegian Patent Application No. 20190567, dated Jan. 17, 2025, 3 pages, pub. by the Norwegian Industrial Property Office, Oslo, Norway.

* cited by examiner

Fig. 6 (Detail A)

Fig. 7 (Detail A)

Fig. 8 (Detail B)

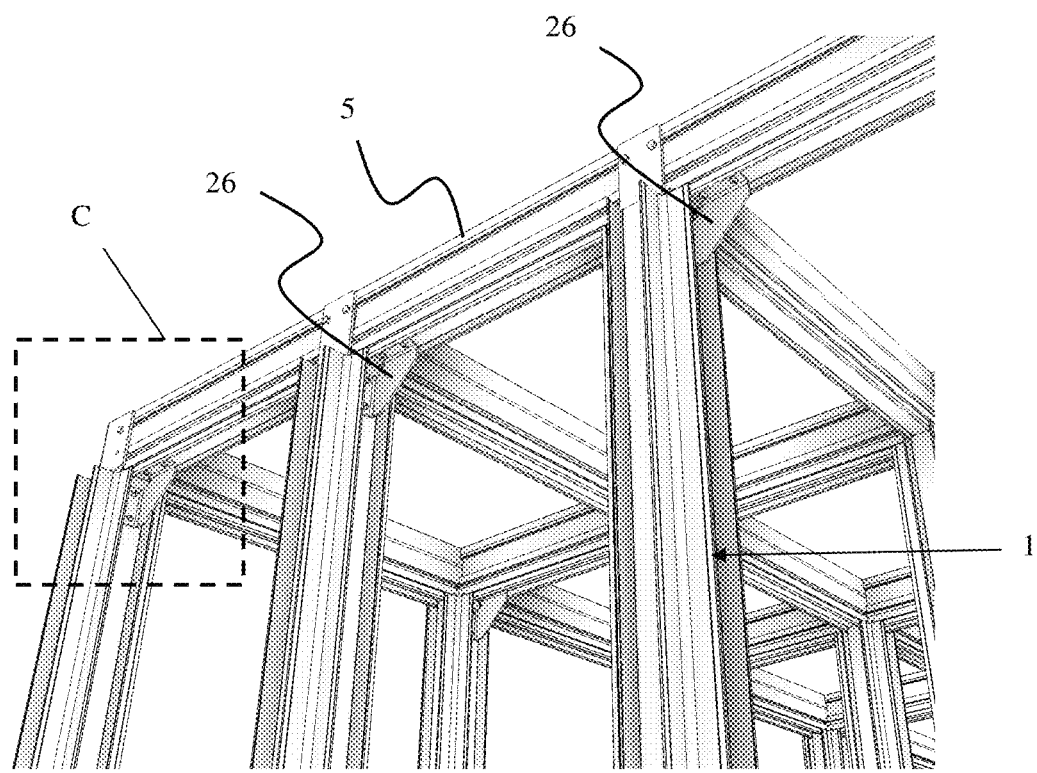
Fig. 10
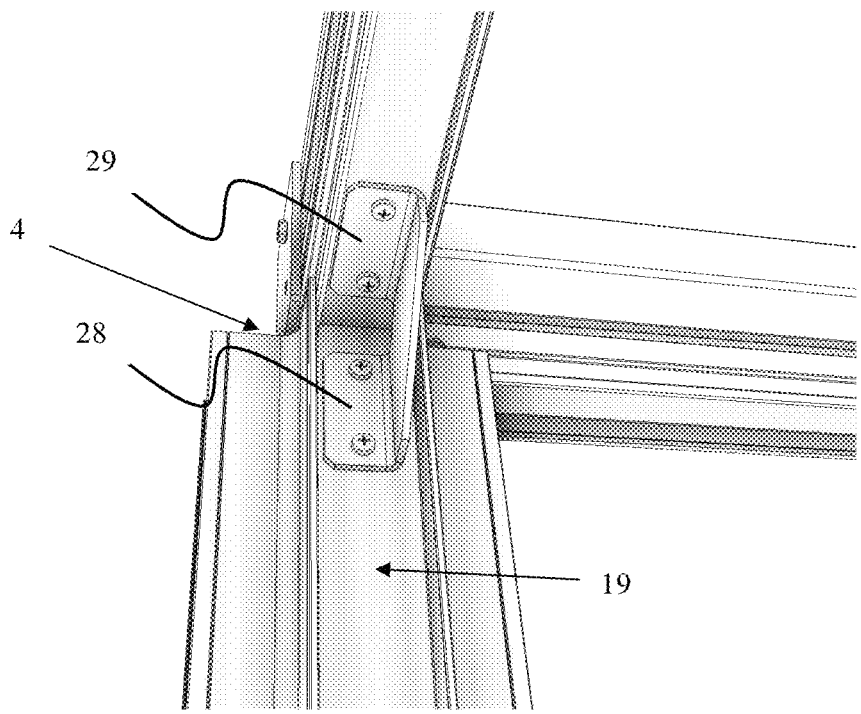
Fig. 11 (Detail C)

STORAGE SYSTEM

TECHNICAL FIELD

The present invention relates to the field of automated storage systems and more specifically to an earthquake resistant storage system.

BACKGROUND

The Applicant's already known AutoStore system is an automated storage system comprising a three-dimensional storage grid structure wherein storage bins/containers are stacked on top of each other to a certain height. Such a prior art system is shown in FIG. 1.

The storage system is disclosed in detail in for instance NO317366, WO 2014/090684 A1 and WO 2015/193278 A1.

The storage system 10 comprises a grid structure 20, see FIG. 2, constructed of aluminium profiles/uprights 1 interconnected by top rails 5. The profiles define multiple storage columns 2, in which the storage bins 30 may be stacked vertically one on top of another.

A cross-sectional view of a prior art profile 1 is shown in FIG. 3 and a cross-sectional view of a storage column 2 for accommodating a stack of storage bins 30 is shown in FIG. 4.

A number of remotely operated vehicles 40, or robots, are arranged on the top rails 5 and may move horizontally on top of the storage grid.

Each vehicle is equipped with a lifting device for picking up, carrying, and placing storage bins 30 that are stored in the storage grid.

The system also comprises picking and/or supply stations 60, where one or several product items are picked out from the storage bin 30 or where one or several product items are placed into the storage bin 30.

When a product item stored in a storage bin is to be picked from the storage grid, the robot is arranged to pick up the storage bin containing that product type and then transport it to a bin lift 50. The bin lift transports the storage bin to the picking and/or supply station 60, where the item of the product type is retrieved from the storage bin. The storage bin with the remaining product items is thereafter returned to the storage grid by means of a bin lift and a robot. The picking and/or supply station 60 illustrated in FIG. 1 is only shown schematically as a simple table upon which the storage bin is arranged.

The same procedure is used for supplying product items into the storage grid. First, items are supplied into a storage bin at a picking and/or supply station. The bin lift then lifts the storage bin up to the upper level where a robot transports the storage bin to its correct position within the storage grid.

A storage control and communication system is used to monitor inventory, to keep track of the location of respective storage bins (within storage grid and/or during transport), the content of each storage bins etc. Further, the storage control and communication system may also comprise, or may be provided in communication with, a control system for controlling the robots to pick a desired storage bin and to deliver it at the desired location at the desired time— without colliding with other robots.

To ensure sufficient stability of the grid structure 20, the prior art storage systems are dependent on an auxiliary grid supporting structure (not shown) arranged at least partly along the periphery of the grid. The requirement of having an auxiliary grid supporting structure is disadvantageous for a number of reasons. The supporting structure occupies space/area which could otherwise be utilized by the storage grid, i.e. it prevents optimum use of available space/area for storage; the need of a supporting structure may limit the available options for positioning of the storage system, i.e. the supporting structure may prevent the optimum positioning of the storage system since the auxiliary grid supporting structure often requires connection to a surrounding structure, such as the inner walls of a building; and the requirement of a supporting structure is not cost efficient. Further, and perhaps more important in certain geographic areas, in case of exposure to high lateral loads due to e.g. an earthquake, the walls of a building supporting a grid structure may be exposed to additional unforeseen and detrimental loads.

In view of the prior art, the purpose of the present invention is to provide a storage system having a storage grid structure that is not dependent on an auxiliary grid supporting structure, i.e. to provide a free-standing storage grid or at least a storage grid requiring a less extensive auxiliary grid supporting structure. Specifically, the purpose of the present invention is to provide an earthquake resistant storage system having a storage grid structure being able to resist earthquake induced forces.

SUMMARY OF THE INVENTION

The present invention is defined by the attached claims and in the following:

In a first aspect, the present invention provides a storage system comprising a storage grid structure and multiple remotely operated storage bin handling vehicles, the storage grid structure comprises vertical storage column profiles defining multiple storage columns in which storage bins can be stored one on top of another in vertical stacks, each of the storage column profiles have an upper end and a lower end and the storage column profiles are interconnected at their upper ends by rails forming a horizontal rail grid upon which the bin handling vehicles may move in two perpendicular directions, wherein the storage grid structure features grid supports comprising multiple base angle brackets, each base angle bracket comprises a vertical flange connected to a storage column profile, a horizontal flange connected by bolts to a floor upon which the storage grid is arranged and a web interconnecting the flanges, each of the flanges comprises a first end and a second end, wherein the first end is arranged closer than the second end to the lower end of the storage column profile to which the vertical flange is connected, and the web has a recess arranged between the first ends of the flanges.

The storage system may also be termed an earthquake resistant or reinforced storage system, or alternatively a storage system comprising an earthquake resistant or reinforced storage grid structure.

The web is preferably vertical, and each of the vertical and horizontal flanges may be arranged in a respective plane being perpendicular to the web.

In an embodiment of the storage system, the lower end of each of the storage column profiles is arranged upon a levelling foot comprising a horizontally moveable levelling device, the levelling device may extend horizontally beyond a lateral cross-section of the storage column profile, and the recess of the web is sized to accommodate the levelling device.

In other words, the recess of the web is arranged to accommodate a part or section of the levelling device extending laterally beyond the cross-section of the storage column profiles.

The recess of the web may be defined as facing both the storage column profile to which the base angle bracket is connected and the floor.

The recess has an upper level or edge in line with the level of the first end of the vertical flange.

In an embodiment of the storage system, the recess of the web is higher than the levelling device and wider than a maximum length the levelling device may extend beyond the lateral cross-section of the storage column profile during use. In other words, the recess may extend to a level above an upper level of the levelling device.

In an embodiment of the storage system, the first end of the vertical flange is at a level of or above the lower end of the storage column profile.

In an embodiment of the storage system, the horizontal flange, i.e. the surface of the flange facing the floor, is at the same level as the floor or at the same level as an upper level of a grid guiding rail arranged upon the floor.

In an embodiment of the storage system, each of the flanges is connected to the storage column profile by at least a first and a second bolt, wherein the first bolt is arranged closer to the respective first end than the second bolt.

In an embodiment of the storage system, the web comprises an inclined upper edge extending between the second ends of the flanges.

In an embodiment of the storage system, the horizontal flange has a width similar to the vertical flange.

In an embodiment of the storage system, the base angle bracket has a maximum width equal to the width of the vertical flange.

In an embodiment of the storage system, at least one of the storage column profiles is connected to two base angle brackets arranged on opposite sides of the storage column profile.

In an embodiment of the storage system, at least one storage column profile is connected to four base angle brackets, and each base angle bracket is staggered by 90 degrees relative to a neighbouring base angle bracket.

In an embodiment of the storage system, each storage column profile has a cross-section comprising a hollow centre section and four corner sections, each corner section comprises two perpendicular bin guiding plates for accommodating a corner of a storage bin, and the vertical flange has a width allowing connection to the centre section without crossing a plane of an adjacent bin guiding plate, such that the base angle bracket may be connected to a storage column profile without interfering with a storage bin whose corner is accommodated by a corner section comprising the adjacent bin guiding plate.

In an embodiment of the storage system, the vertical flange is arranged within the recess of the storage column profile to which it is connected.

In an embodiment of the storage system, the vertical flange is connected directly to the centre section of the storage column profile.

In an embodiment of the storage system, two bin guiding plates, one of each of two corner sections, are parallel and extend in the same direction forming a recess delimited by the two bin guiding plates and an external surface of the centre section, and the recess has a width suitable for accommodating the vertical flange.

In an embodiment, the storage system may comprise multiple rail angle brackets connecting the storage profile columns to the rails, each rail angle bracket comprises a vertical flange connected to a storage column profile and a horizontal flange connected to a rail arranged at the upper end of the storage column profile.

In an embodiment of the storage system, the vertical flange and the horizontal flange of the rail angle bracket have a maximum width equal to the width of the recess of the storage column profile.

In an embodiment, the storage system may comprise multiple support struts arranged between at least some neighbouring storage column profiles, each support strut has a maximum width equal to the width of the recess of the storage column profiles, such that the support strut may be connected to the centre sections of the neighbouring storage column profiles without crossing a plane of an adjacent bin guiding plate.

In other words, the support struts are connected to neighbouring storage column profiles without extending into a storage column which the neighbouring storage column profiles are a part of.

In an embodiment of the storage system, the support struts comprise vertically inclined support struts, horizontal support struts or a combination thereof.

In an embodiment of the storage system, the support struts are riveted to the centre section.

In a second aspect, the present invention provides a method of earthquake reinforcing a storage grid structure of a storage system, the storage grid structure is arranged on a floor and comprises vertical storage column profiles defining multiple storage columns in which storage bins can be stored one on top of another in vertical stacks, each of the storage column profiles have an upper end and a lower end and the storage column profiles are interconnected at their upper ends by rails forming a horizontal rail grid upon which the bin handling vehicles may move in two perpendicular directions, wherein the method comprises the steps of:
  a) connecting a base angle bracket to a storage column profile and the floor, the base angle bracket comprises a vertical flange for connection to the storage column profile, a horizontal flange for connection to the floor and a web interconnecting the flanges, each of the flanges comprises a first end and a second end, such that the first end is arranged closer than the second end to the lower end of the storage column profile to which the vertical flange is connected; and
  b) repeating step a) until multiple storage column profiles are connected to a base angel bracket and the storage grid structure has a sufficient resistance to lateral forces.

In an embodiment of the method, step b) provides base angle brackets arranged in four different directions staggered by 90 degrees.

In an embodiment, the horizontal flange of each base angel bracket is connected to the floor by use of bolts, preferably the floor is a concrete floor and each bolt has a concrete anchor.

In an embodiment, the method comprises a step of arranging rail angle brackets connecting the storage profile columns to the rails.

In an embodiment, the method comprises a step of providing support struts connecting at least some neighbouring storage column profiles.

The method may also comprise any of the technical features defined in the embodiments of the first aspect.

SHORT DESCRIPTION OF THE DRAWINGS

Embodiments of the invention will now be described in greater detail by way of example only and with reference to the following drawings:

FIGS. 10 and 11 are perspective detailed views of the storage grid structure in FIG. 5 showing rail angle brackets.

DETAILED DESCRIPTION OF THE INVENTION

As discussed above, the prior art storage system shown in FIG. 1 is dependent on having an auxiliary grid supporting structure (not shown), since the grid structure itself is not sufficiently stable towards forces having a substantial horizontal component, i.e. lateral forces. Such forces may be present as a result of movement and acceleration of the remotely operated vehicles 40, or robots, arranged on the grid of rails 5 on top of the grid structure, and as a result of external circumstances such as an earthquake. In case of an earthquake, the grid structure will also be exposed to vertical forces via the floor upon which the grid structure is arranged.

Figure 1:
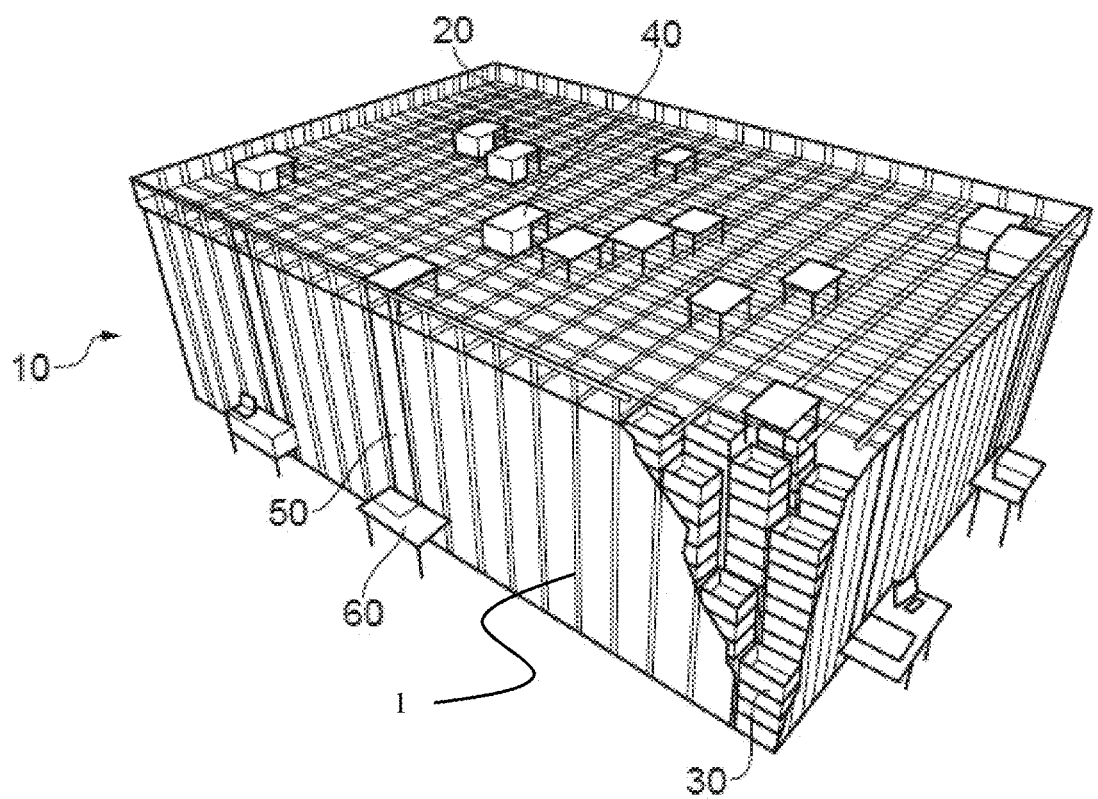
FIG. 1 is a perspective view of a prior art storage system.
Figure 2:
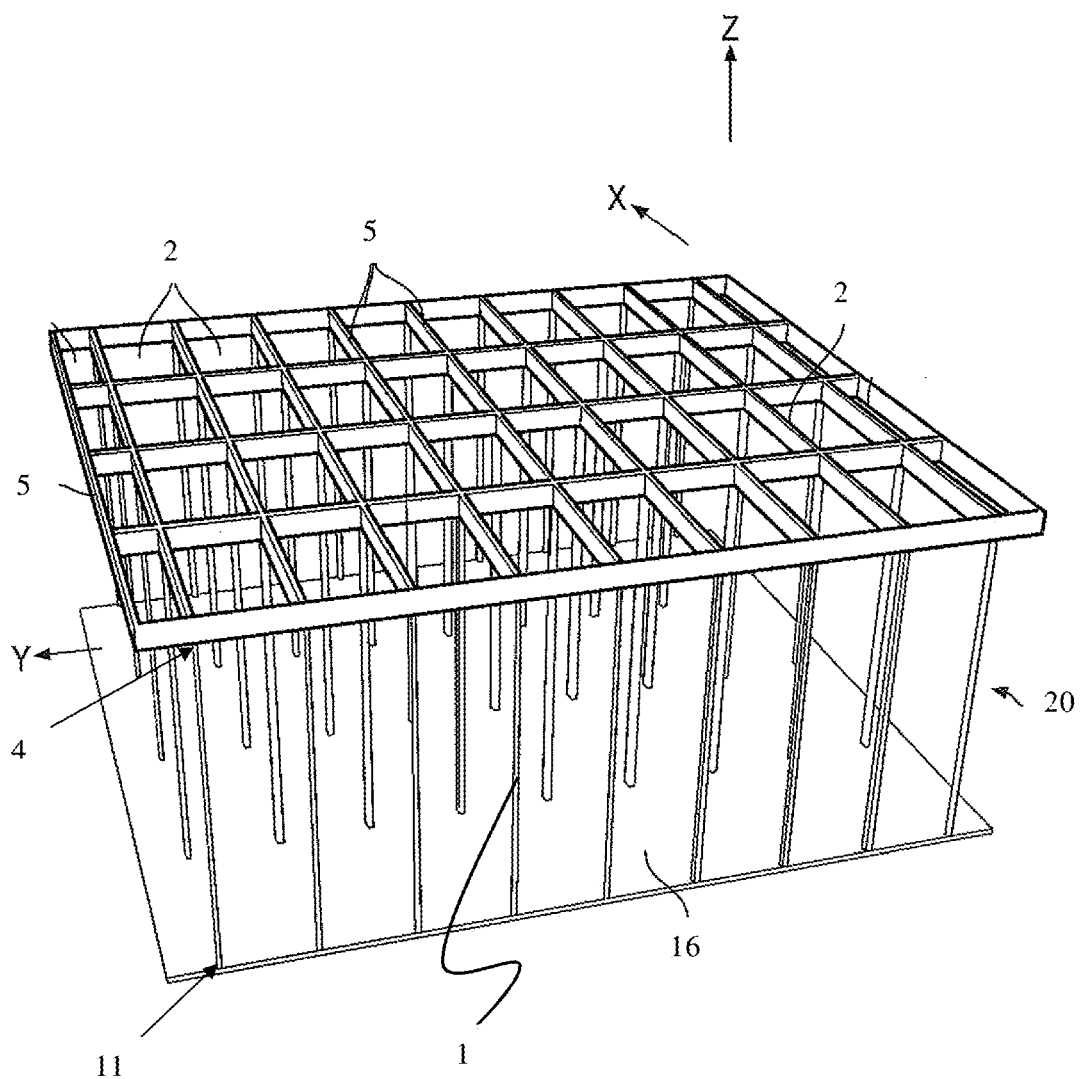
FIG. 2 is a perspective view of the grid structure of the prior art storage system in FIG. 1.
Figure 3:
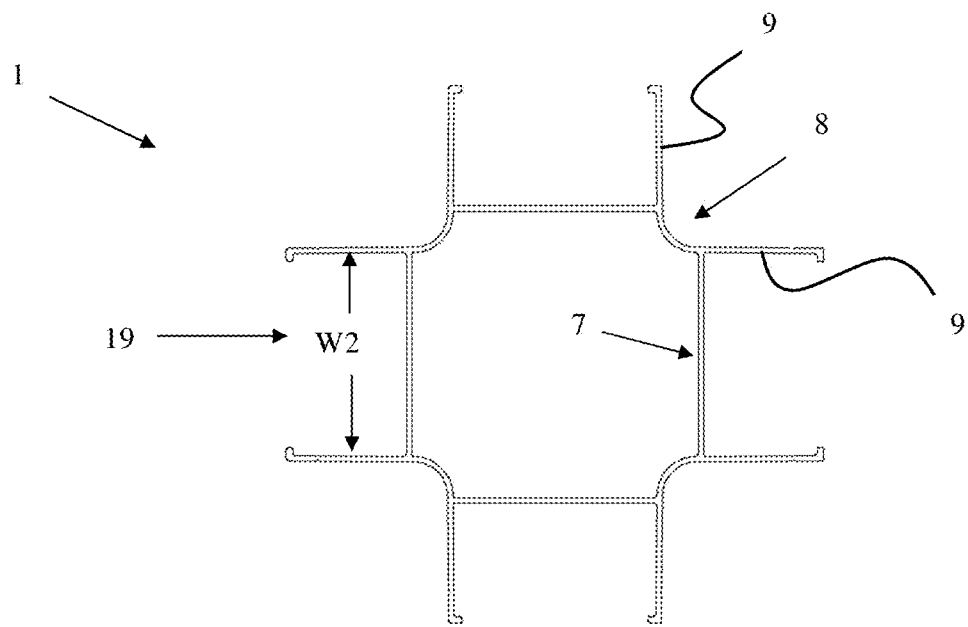
FIG. 3 is a cross-sectional view of a prior art storage column profile.

The grid structure 20 of the prior art storage system in FIG. 1 is made up of multiple vertical profiles 1 (i.e. storage column profiles), see FIG. 3, interconnected at their top ends 4 by rails 5. Four profiles 1 make up a storage column 2, in which multiple storage bins may be stacked. The profiles 1 have a cross-section featuring a hollow centre section 7 and four corner sections 8, wherein each corner section comprises two perpendicular bin guiding plates 9. The two perpendicular bin guiding plates 9 are arranged to accommodate a corner 11 of a storage bin 30 (or a corner of a stack of storage bins). In other words, each of the corner sections 8 defines two sides of a substantially triangular area (or a triangular space considering the longitudinal dimension of the profile) which may accommodate a storage bin corner 11, see FIG. 4, wherein a storage bin is represented by a dotted square. The corner sections 8 are evenly arranged around the centre section 7, such that multiple profiles may provide multiple adjacent storage columns 2, wherein each profile may be common for up to four separate storage columns. Sets of two parallel bin guiding plates 9 belonging to two adjacent corner sections 8 delimits four recesses 19, each having a width W2.

Figure 4:
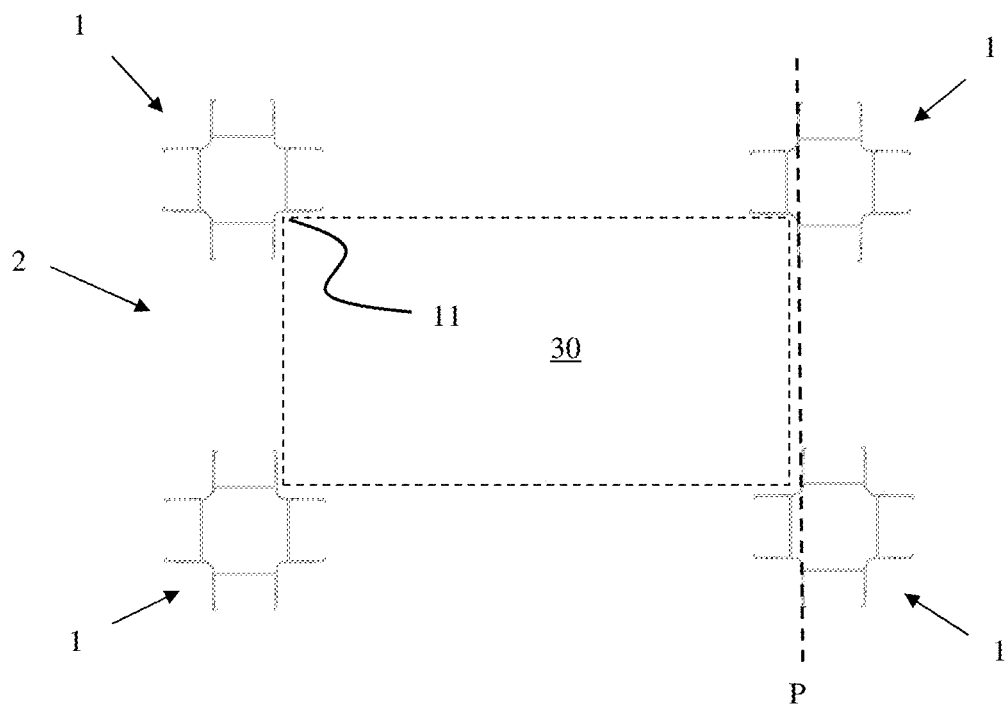
FIG. 4 is a cross-sectional view of a prior art storage column made up of four storage column profiles as shown in FIG. 3.

A cross-sectional view of a storage column 2, made up of four prior art profiles 1, is shown in FIG. 4. The cross section of the profile is constant over the whole length of the profile. The horizontal periphery of a storage bin 30 having four corners 11 is shown to illustrate how the storage bin (or stack of storage bins) is arranged in the storage column 2. The four corner sections 8, one from each of the four profiles 1, ensure that a storage bin 30 introduced into the storage column 2 is guided into a correct position relative to both any storage bin already present in the storage column and the stacks of storage bins in the surrounding storage columns.

Figure 5:
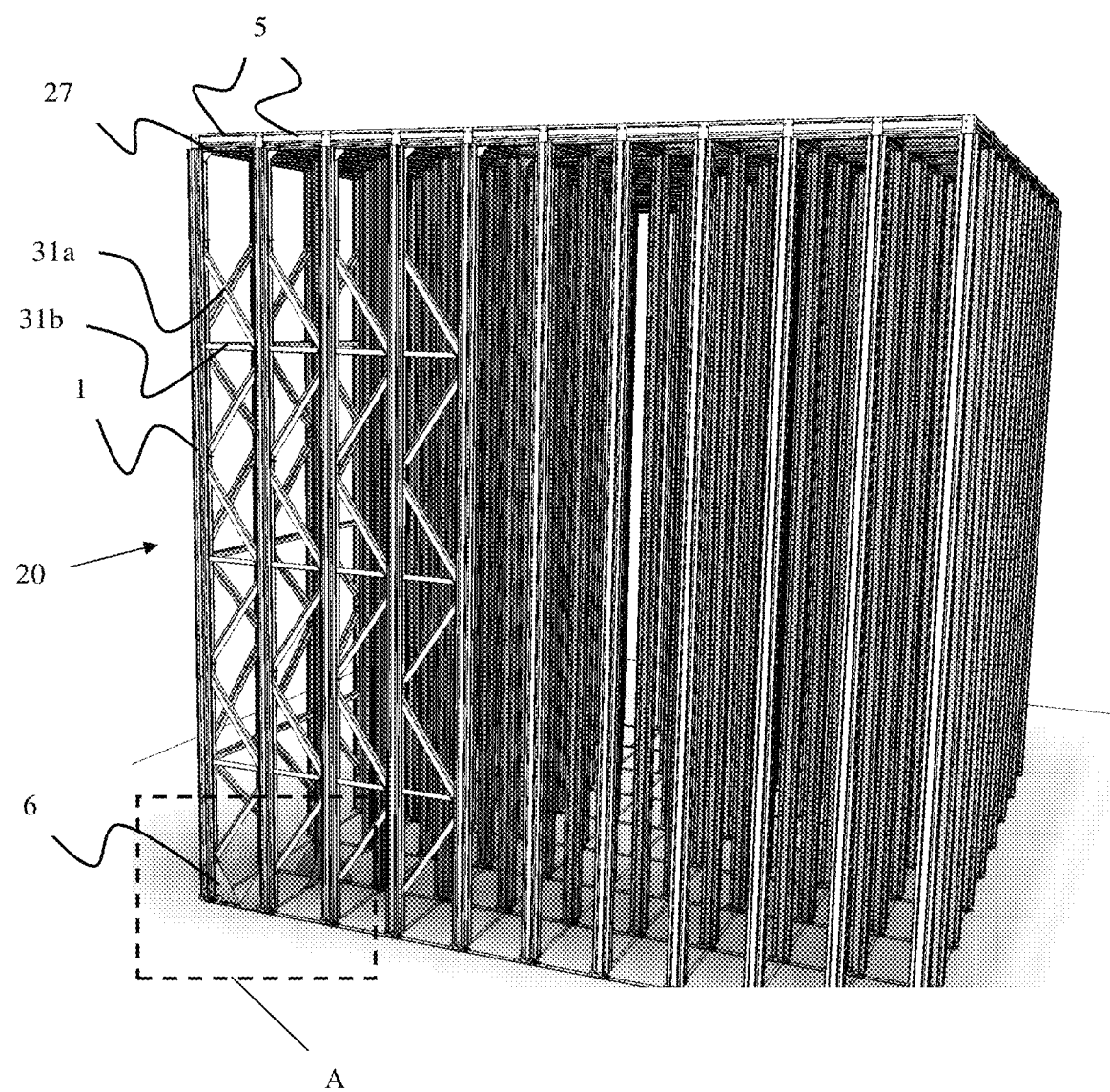
FIG. 5 is a perspective view of an exemplary storage grid structure for a storage system according to the invention.
Figure 6:
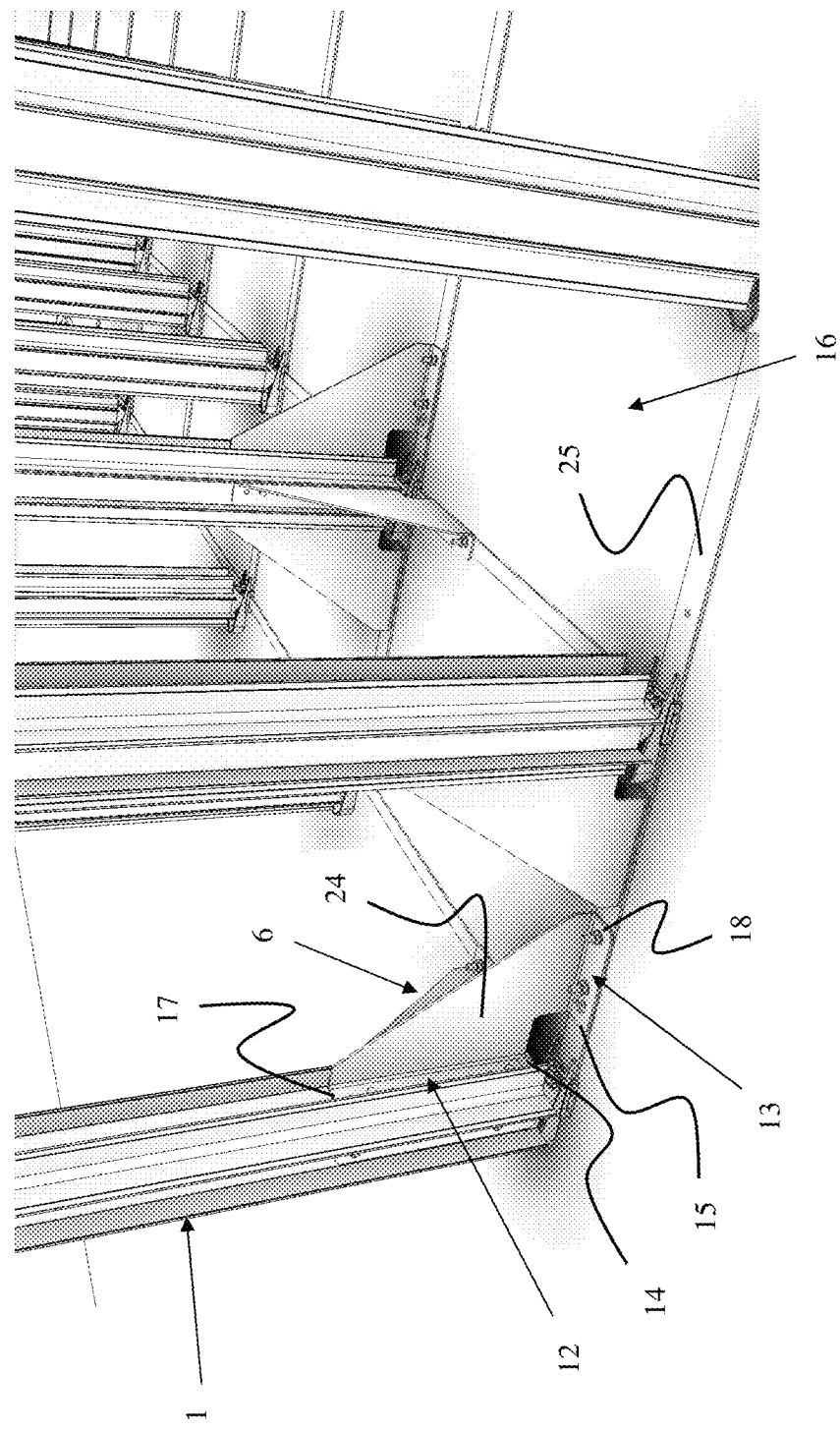
FIGS. 6 and 7 are a perspective detailed views of the storage grid structure in FIG. 5.
Figure 7:
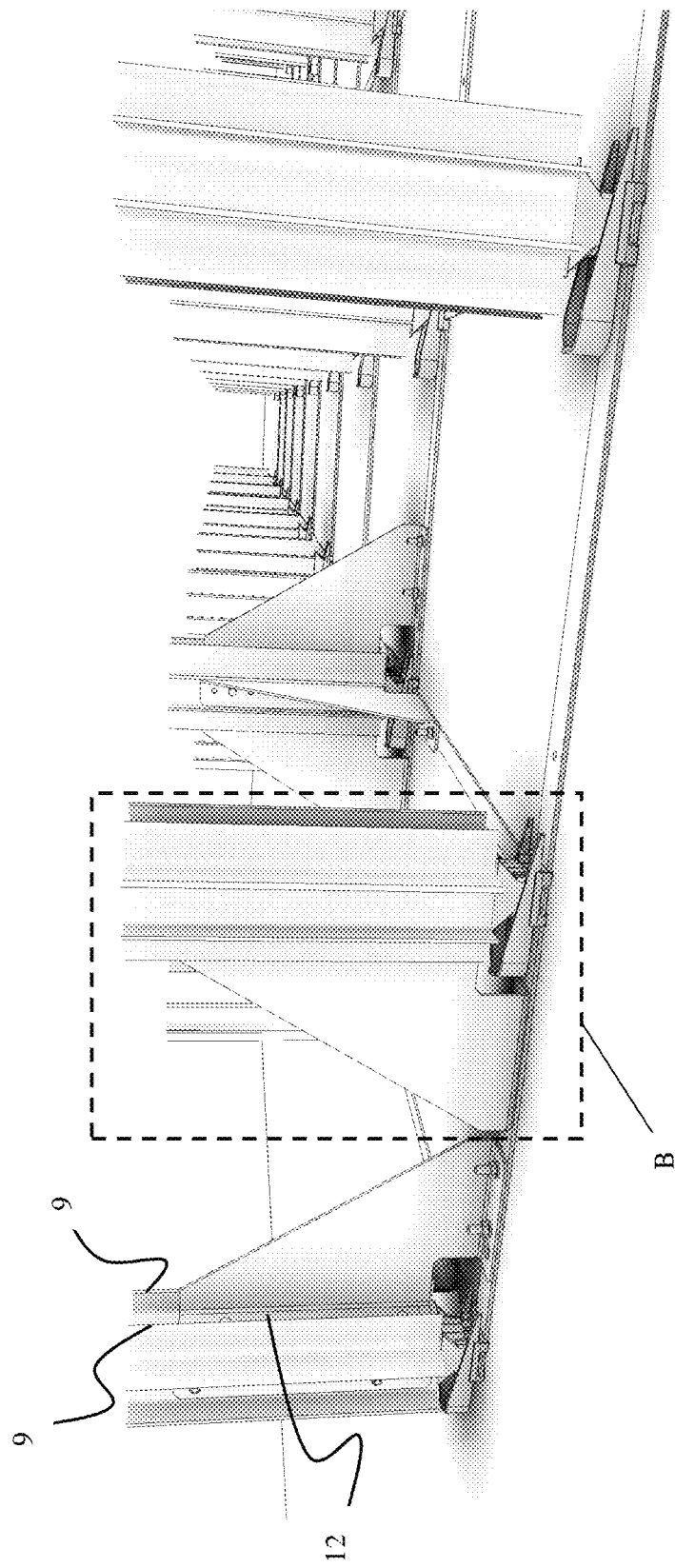
Figure 8:
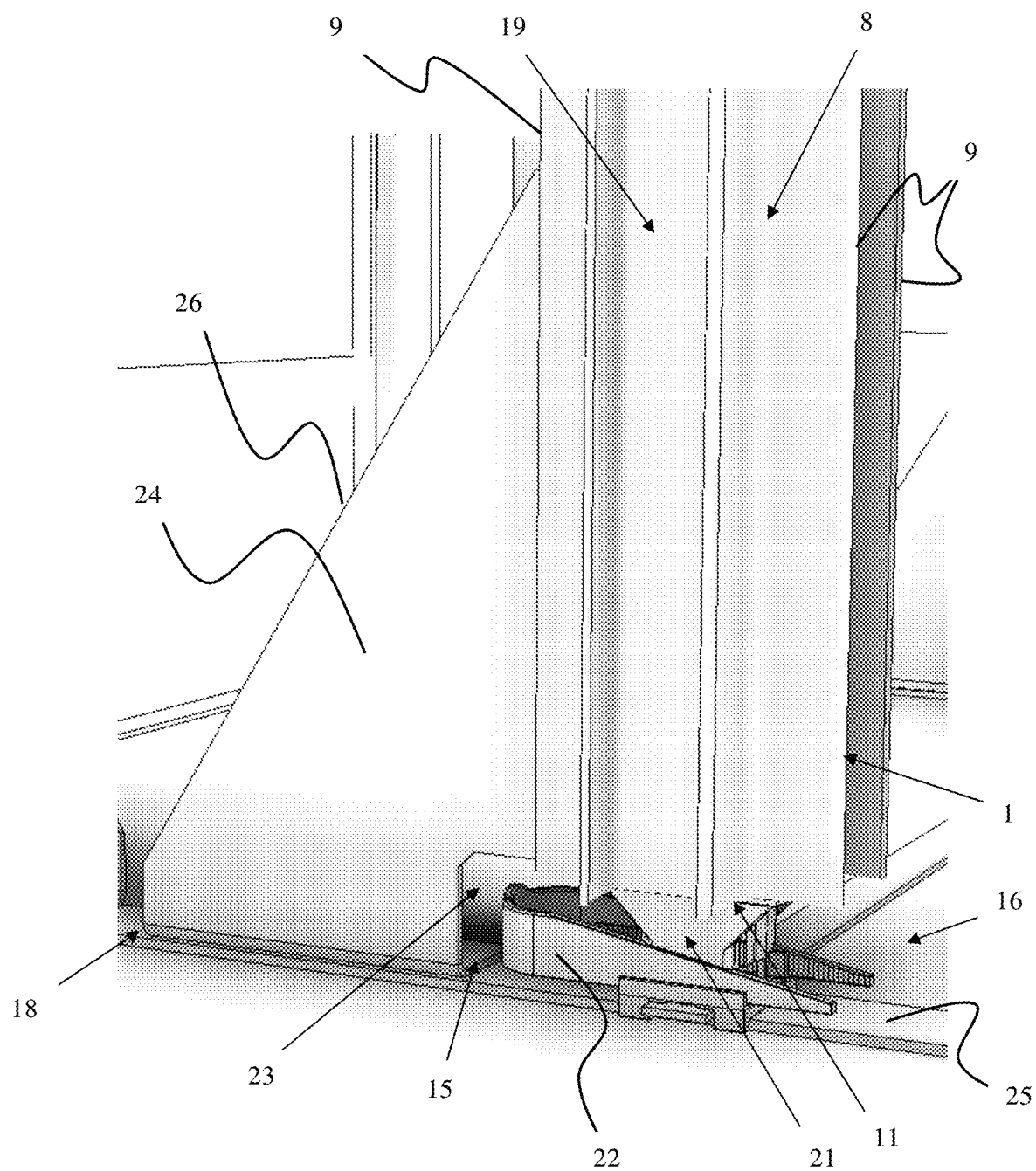
FIG. 8 is a perspective view of a base angle bracket of the storage grid structure in FIG. 5.
Figure 9:
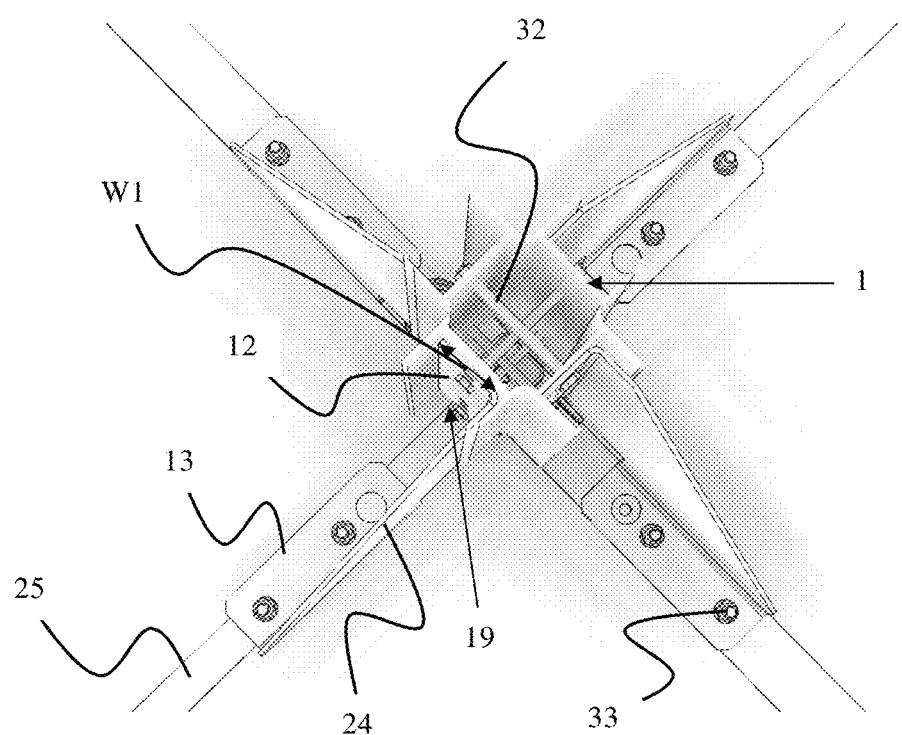
FIG. 9 is a cross-sectional top view of a storage column profile featuring four base angle brackets.

An exemplary storage grid structure 20 according to the invention is shown in FIG. 5. Contrary to the prior art storage grid structure in FIG. 1, the exemplary storage grid structure may comprise different types of grid support elements 6,27,31a,31b providing the grid structure with an increased resistance to lateral forces. It is noted that the type of grid support elements being used, as well as their number and positioning within the storage grid structure, will vary depending on the requirements put on the storage grid structure for withstanding lateral and vertical forces. For instance, in case of earthquake resistance all types of grid support elements described below may be required. The various grid support elements are described in more detail below.

An exemplary first grid support element 6 of the exemplary storage grid 20 is shown in FIGS. 6-9. The first grid support element is a base angle bracket 6 arranged to connect a storage column profile 1 to a floor 16 upon which the storage grid structure is arranged. The floor 16 is the floor of a building in which a storage system is accommodated. Each base angle bracket 6 comprises a vertical flange 12 connected to the centre section 7 of a storage column profile 1, a horizontal flange 13 connected to the floor 16 and a web 24 interconnecting the flanges 12,13. Each of the flanges comprises a first end 14,15 and a second end 17,18, wherein the first end is arranged closer than the second end to the lower end 11 of the storage column profile to which the vertical flange 12 is connected. To allow connection of the vertical flange to the centre section of the storage column profile, the width W1 of the vertical flange 12 is smaller than the distance W2 between two parallel bin guiding plates 9. Further, the base angle bracket has a maximum width equal to the distance W2 which ensures that the base angle bracket does not extend into the space of a storage column. In this manner, the storage grid structure may be supported by the base angle brackets without interfering with the stacks of storage bins arranged in the storage columns. The base angle brackets are preferably made of steel.

The storage grid structure comprises a horizontal grid of guiding rails 25 (i.e. grid guiding rails). The function of the guiding rails is to facilitate the accurate positioning of the storage column profiles. In the exemplary embodiment, the base angle bracket is connected to the floor via through-holes (not shown) in the guiding rails. The vertical and horizontal flanges may be connected to the storage column profile and the floor, by use of suitable bolts 32,33. The bolts 32 connecting the vertical flange to the storage column profile are commonly through bolts and may be used to connect two base angle brackets connected at opposite sides of a storage column profile. In alternative embodiments, the vertical flange may also be riveted to the storage column profile. The bolts 33 connecting the base angle bracket 6 to the floor 16 may be any type of bolt suitable for the material or construction of the specific floor upon which the storage grid structure is arranged, e.g. a bolt having a concrete anchor.

Having the base angel brackets 6 connected to the floor 16 and the storage column profiles is highly advantageous in that movement of the storage column profiles, and consequently the storage grid structure, relative to the floor is restricted in both lateral and vertical directions. In case of an earthquake, having the storage grid structure following the movement of the floor 6 is believed to at least minimize the potential damage caused to the storage system. Further, having the storage column profiles connected to the floor also prevents them from moving relative to each other. If the storage column profiles could move relative to each other during an earthquake, even a relatively weak earthquake would cause many of the containers stacked within the storage columns to become stuck. Due to the interconnection of the different elements of the storage grid structure, it is commonly not required to have a base angel bracket connected to each of the storage column profiles.

In the exemplary storage grid structure, each storage column profile 1 is arranged upon a levelling foot 21. In practice, the floor 16 upon which the storage grid structure 20 is to be arranged will not have a sufficiently even surface, and each storage column profile is commonly levelled to provide a level grid of rails 5 upon which the remotely operated vehicles 40 may move, see description of prior art and FIG. 1. The levelling foot 21 facilitates the levelling of the storage column profiles and comprises a horizontally moveable levelling device 22. Depending on the required levelling, the levelling device will extend horizontally a given distance beyond a lateral cross-section of the storage column profile 1. Details of the levelling foot is disclosed in WO 2017/198784 A1.

To allow connection of the base angle bracket to the base and the centre section of a storage column profile, the web 24 of the base angel bracket features a recess 23 arranged between the first ends 14,15 of the flanges 12,13 to accommodate the levelling device 22. The recess 23 extends higher than the levelling device 22 and is deeper than the maximum length the levelling device 22 may extend beyond the lateral cross-section of the storage column profile during use. The recess 23 ensures that the mounting of the base angle brackets 6 is both simple, cost-efficient and does not require any intermediate connecting elements between the base angle bracket 6, the storage column profile 1 and the floor 16. In addition to the advantageous mounting, the disclosed base angle brackets 6 may also be manufactured in a very cost-efficient and simple manner by making a suitable steel sheet template wherein the required vertical and horizontal flanges are obtained by folding/bending two edges of the steel sheet template. That is, the base angle bracket 6 is made up of a single steel sheet, wherein the flanges are sections of the steel sheet being bent into respective planes being perpendicular to the section of the steel sheet making up the web.

The number of base angle brackets 6 used to support a storage grid structure 20 may vary depending on the support requirements and/or a cost/benefit analysis regarding an earthquake reinforcement. However, a free-standing storage grid structure will commonly comprise multiple base angle brackets arranged in four different directions staggered by 90 degrees.

Exemplary second grid support elements are shown in FIGS. 10 and 11. The second grid support elements are rail angle brackets 27 connecting the storage profile columns 1 to the rails 5 forming a grid of rails at the top of the storage grid structure 20. Each rail angle bracket 27 comprises a vertical flange 28 connected to a storage column profile 1 and a horizontal flange 29 connected to a rail 5 arranged at the upper end 4 of the storage column profile. To prevent the rail angle brackets from interfering with storage bins arranged in the storage columns, the vertical flange 28 and the horizontal flange 29 of the rail angle bracket 27 may have a maximum width equal to the width W2 of the recess 19 of the storage column profile 1. The vertical flange 28 and the horizontal flange 29 of the rail angle bracket 27 are interconnected by a web 26. The construction of the rail angle brackets may be varied provided the maximum width is equal to the width W2 of the recess 19 of the storage column profile 1.

Figure 12:
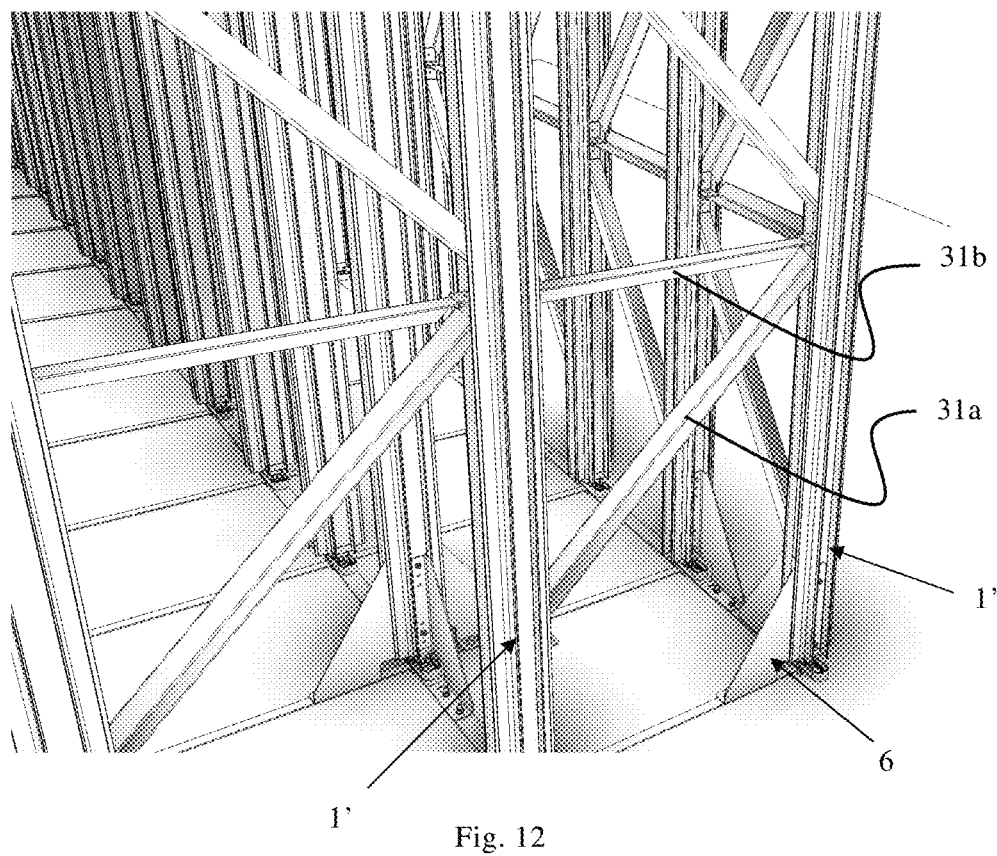
FIGS. 12 and 13 are perspective detailed views of the storage grid structure in FIG. 5 showing support struts.
Figure 13:
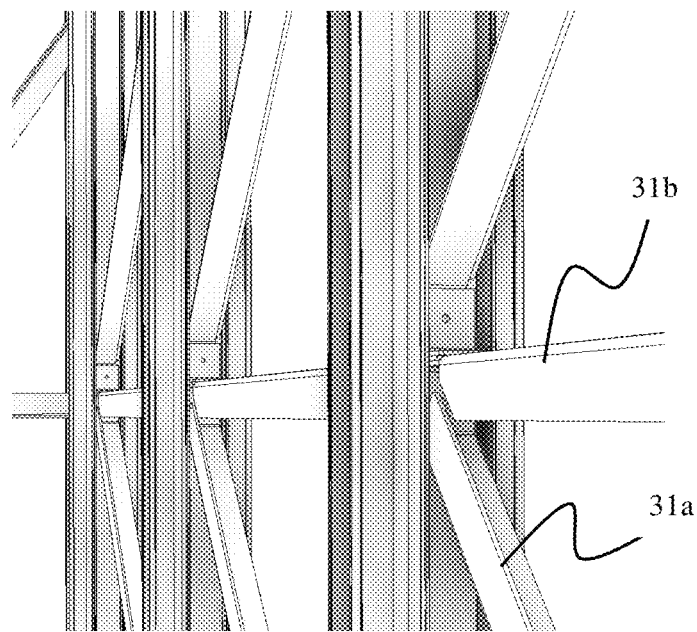

Exemplary third grid support elements are shown in FIGS. 12 and 13. The third grid support elements are support struts 31a,31b arranged between at least some neighbouring storage column profiles 1',1' of the storage grid structure. Similar to the first and second grid support element, each support strut has a maximum width equal to the width W2 of the recess 19 of the storage column profiles 1, such that the support strut may be connected to the centre sections 7 of two neighbouring storage column profiles without crossing a plane P (see. FIG. 4) of an adjacent bin guiding plate 9.

The support struts may be vertically inclined support struts 31a, horizontal support struts 31b or a combination thereof. In the exemplary storage grid structure, the support struts are riveted to the centre section of the respective storage column profiles. Connecting the support struts by rivets allows for easy mounting of the support struts on an existing storage grid structure. However, the support struts may also be connected by for instance bolts as described for the base angle brackets.

The exemplary storage grid structure 20 in FIG. 5 comprises base angle brackets 6, rail angle brackets 27 and support struts 31a,31b. However, if the requirement for withstanding lateral loads is relatively low, it may be sufficient for a storage grid structure according to the invention to only feature grid support elements in the form of multiple base angle brackets.

The invention claimed is:

1. A storage system comprising a storage grid structure and multiple remotely operated storage bin handling vehicles, the storage grid structure comprises vertical storage column profiles defining multiple storage columns in which storage bins can be stored one on top of another in vertical stacks, each of the storage column profiles have an upper end and a lower end and the storage column profiles are interconnected at the upper ends by rails forming a horizontal rail grid upon which one or more bin handling vehicles may move in two perpendicular directions, wherein
  the storage grid structure features grid supports comprising multiple base angle brackets, each base angle bracket comprises a vertical flange connected to a storage column profile, a horizontal flange connected by bolts to a floor upon which the storage grid is arranged and a web interconnecting the flanges, each of the flanges comprises a first end and a second end, wherein the first end is arranged closer than the second end to the lower end of the storage column profile to which the vertical flange is connected, and the web has a recess arranged between the first ends of the flanges;
  wherein the lower end of each of the storage column profiles is arranged upon a levelling foot comprising a horizontally moveable levelling device, the levelling device may extend horizontally beyond a lateral cross-section of the storage column profile, and the recess is sized to accommodate the levelling device.

2. The storage system according to claim 1, wherein the recess is higher than the levelling device and wider than a maximum length the levelling device may extend beyond the lateral cross-section of the storage column profile during use.

3. The storage system according to claim 1, wherein the first end of the vertical flange is at a level of or above the lower end of the storage column profile.

4. The storage system according to claim 1, wherein the horizontal flange is at the same level as the floor or at an upper level of a grid guiding rail arranged upon the floor.

5. The storage system according to claim 1, wherein the web comprises an inclined upper edge extending between the second ends of the flanges.

6. The storage system according to claim 1, wherein each storage column profile has a cross-section comprising a hollow centre section and four corner sections, each corner section comprises two perpendicular bin guiding plates for accommodating a corner of a storage bin, and the vertical flange has a width (W1) allowing connection to the centre section without crossing a plane (P) of an adjacent bin guiding plate, such that the base angle bracket may be connected to a storage column profile without interfering with a storage bin whose corner is accommodated by a corner section comprising the adjacent bin guiding plate.

7. The storage system according to claim 6, wherein two bin guiding plates, one of each of two corner sections, are parallel and extend in the same direction forming a recess delimited by the two bin guiding plates and an external surface of the centre section, and the recess has a width (W2) suitable for accommodating the vertical flange.

8. The storage system according to claim 7, comprising multiple support struts arranged between at least some neighbouring storage column profiles, each support strut having a maximum width equal to the width (W2) of the recess of the storage column profiles, such that the support strut is connected to the centre sections of the neighbouring storage column profiles without crossing a plane (P) of an adjacent bin guiding plate.

9. The storage system according to claim 8, wherein the support struts comprise vertically inclined support struts, horizontal support struts or a combination thereof.

10. The storage system according to claim 1, comprising multiple rail angle brackets connecting the storage profile columns to the rails, each rail angle bracket comprises a vertical flange connected to a storage column profile and a horizontal flange connected to a rail arranged at the upper end of the storage column profile.

11. The storage system according to claim 10, wherein the vertical flange and the horizontal flange of the rail angle bracket have a maximum width equal to the width (W2) of the recess of the storage column profile.

12. The storage system according to claim 1, further comprising one or more remotely operated storage bin handling vehicles, each configured to move horizontally above the grid.

13. The storage system of claim 12, where in the system further comprises a network of rails arranged above the grid and configured to support the one or more remotely operated storage bin handling devices.

* * * * *